May 22, 1962 C. C. LERICHE 3,035,531
BOX CAR SIDE SILL, DOOR FRAME, AND GIRDER
Filed June 27, 1955 2 Sheets-Sheet 1
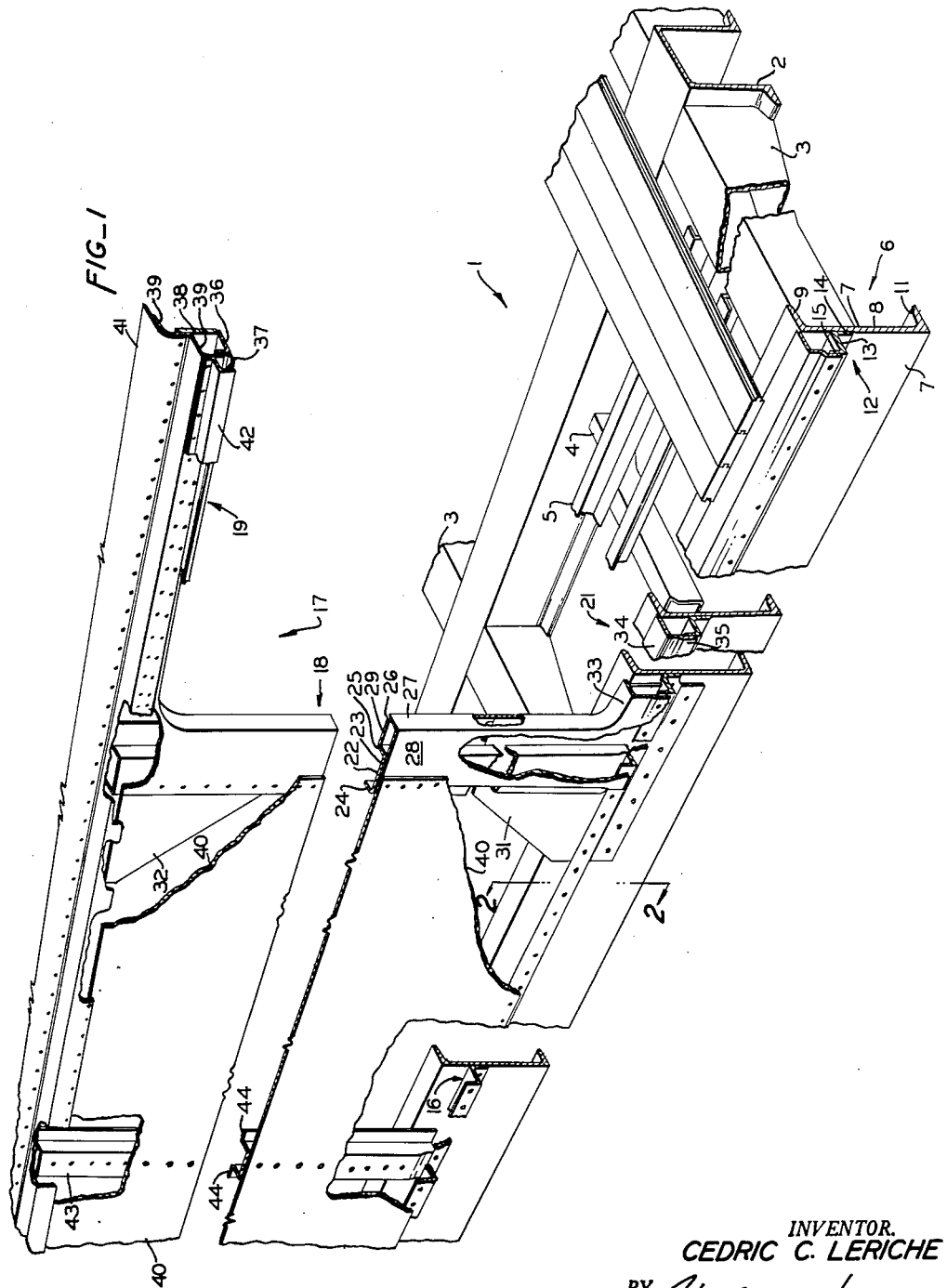
INVENTOR.
CEDRIC C. LERICHE
BY
ATTORNEYS May 22, 1962 C. C. LERICHE 3,035,531
BOX CAR SIDE SILL, DOOR FRAME, AND GIRDER
Filed June 27, 1955 2 Sheets-Sheet 2
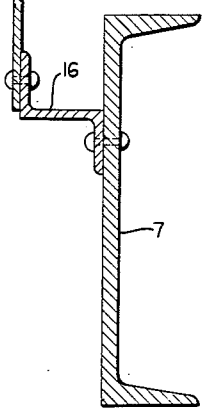
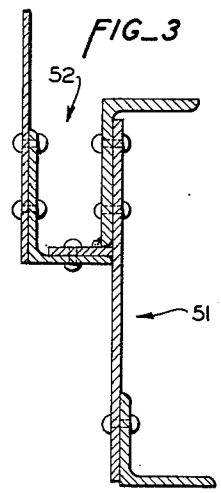
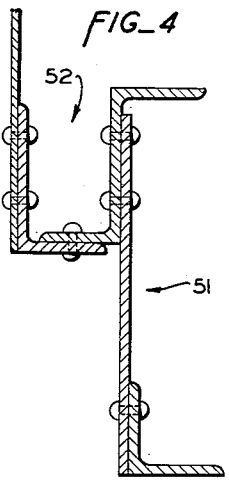
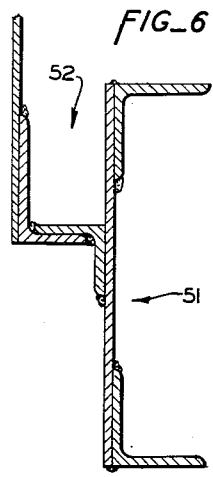
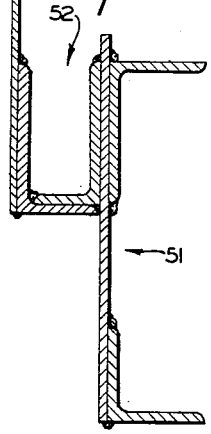
INVENTOR.
CEDRIC C. LERICHE
BY *Mellin and Hanscom*
ATTORNEYS

United States Patent Office 3,035,531
Patented May 22, 1962

3,035,531
BOX CAR SIDE SILL, DOOR FRAME, AND GIRDER
Cedric C. Leriche, 1626 Seaborn Court, Alameda, Calif.
Filed June 27, 1955, Ser. No. 518,100
3 Claims. (Cl. 105—404)

This invention relates to the construction of a railroad box car, particularly, the side sill construction and the construction around the door openings.

In a box car construction, the sides are the principal load-carrying members. In effect, the sides are girders, the top chord being composed of the side plate and the bottom chord consisting of the side sill angle and the side sill reinforcement below the door opening. For cars having wide doors, the side plates are also reinforced at the door openings.

Furthermore, in conventional construction the side sill reinforcement is secured to the ends of the cross members of the underframe and is part of the underframe. The flanges of the side sill angle and the side sill reinforcement are secured together by rivets; the floor rests on the horizontal leg of the side sill angle; and of necessity the greater portion of the vertical leg of the side sill angle is coped or sheared off at the door opening. The door posts usually consist of rolled steel shapes riveted together and are secured to the side plate and side sill angles by gusset plates.

The weight of the lading on the car floor is transferred through the underframe to the sides of the car by the rivets securing the side sill reinforcement to the side sill angle. The unit stresses in the sides are greatest at the door opening, reaching the maximum in the bottom chord at the junction of the bottom chord and the door posts in the coped portion of the side sill angle. The reduction in depth of the vertical leg of the side sill angle by coping in the door opening, plus the fact that the unit stresses are greatest at this point, create a potential cause for failure. This is evidenced by the fact that these failures usually originate in said coped portion and progress downward causing the underframe to separate and sag from the sides. Furthermore, since the side sill reinforcement is secured to the side sill angle with rivets subjected to tensional stress, these rivets tend to become loose permitting the side sill reinforcements to separate from the side sill angle, also resulting in sagging of the underframe. The sagging of the underframe permits the door to become disengaged from the retaining bar at the top of the door opening and fall from the car. These failures of side sill reinforcement result in heavy maintenance costs and considerable hazard of critical injury to personnel.

One object of the present invention is to provide a unitary door frame structure cooperating with suitably shaped door posts, side sill member, and side plate, to form a rigid box-like construction along the top and bottom edges of the door opening.

A further object of this invention is the provision of a fabricated side sill of suitable configuration for cooperation with the other elements of the car such as the door posts, side plate, and door frame without the necessity of coping the side sill and without the necessity of resorting to a unitary rolled steel side sill.

Various other objects and advantages of the instant invention will become apparent in reading the following description thereof, when taken in conjunction with the accompanying drawings wherein:

FIG. 1 is a perspective view of a freight car underframe and girder embodying the objects of my invention with portions thereof broken away to better illustrate its construction.

FIG. 2 is a vertical section of the fabricated side sill forming an integral part of the girder illustrated in FIG. 1, and taken on the section line 2—2 of FIG. 1.

FIG. 3 is a vertical section of a first modification of the side sill illustrated in FIG. 2.

FIG. 4 is a vertical section of a second modification of the side sill illustrated in FIG. 2.

FIG. 5 is a vertical section of a third modification of the side sill illustrated in FIG. 2; and FIG. 6 is a vertical section of a fourth modification of the side sill illustrated in FIG. 2.

As shown in FIG. 1, the objects of my invention have been embodied in a freight car comprising an underframe generally designated by the reference numeral 1, and including a center sill 2; cross-bearers 3; cross-ties 4; and floor stringers 5, all of conventional construction.

Welded or otherwise secured to the outer ends of the cross-bearers and cross-ties are side sills (only one being shown) extending unbroken throughout substantially the length of the underframe and generally designated by the reference numeral 6. Making up the sill 6 is an inwardly facing channel 7 including a central web 8 and a pair of leg 9 and 11. Secured to the web 8 adjacent its upper end is a Z-bar generally designated by the reference numeral 12 and including a central horizontal web 13, a downwardly extending leg 14 and an upwardly extending leg 15. The side sill 6 may therefore be considered as being made up of a horizontally extending, inwardly facing channel provided adjacent the upper portion of its central web with an upwardly facing channel 16 formed integral therewith.

Secured to the side sill 6 is a rectangular door frame generally designated by the reference numeral 17 and including a pair of door frame posts generally designated by the reference numeral 18, an overhead door frame cross member generally designated by the reference numeral 19, and a lower door frame cross member generally designated by the reference numeral 21.

As shown in FIG. 1, each of the door frame posts 18 (only one being shown) includes an outer vertically extending, inwardly facing channel 22 including a central web 23, and legs 24 and 25. Merging with the leg 25 and formed as a part thereof is an outwardly extending channel 26 including a leg 27. Merging with the leg 27 and formed integral therewith is a plate 28 which closes the open face of the channel 26 and overlaps the web 23 of the inwardly facing channel 22. The lower end of the inwardly extending channel 22 is snugly accommodated within the upwardly facing channel of the side sill 6, and the lower end of the plate 28 overlaps the upwardly extending leg 15 of the Z-bar 12. Formed as coplanar extensions of the web 29 of the channel 26 at both ends thereof are triangular shaped gussets 31 and 32, the lower end of the gusset 31 being disposed between the web 8 of the side sill channel 7 and the downwardly extending leg 14 of the Z-bar 12. For this purpose the Z-bar is laterally offset.

The door frame plate 28 and the channel leg 27 at their lower ends extend to the right as shown in FIG. 1 to form a door frame sill angle 33, including a horizontal leg 34 and a contoured vertical leg 35. The leg 35 overlaps and is fastened to the vertical leg 15 of the Z-bar 12 and the leg 34 is fastened to the upper outer corner of the side sill channel 7, thereby forming a box-like member integral with the side sill.

Forming the overhead door frame cross member 19 is an upwardly and inwardly facing door frame lintel angle 36 merging and formed integral with the channel leg 27 and plate 28. Welded to the vertical leg of the angle 36 is a door header 37 and welded to the horizontal leg of the angle 36 is a vertical reinforcing plate 38. Overlapping the plate 38 and the vertical leg of the angle 36, and forming a box-like structure therewith, is the car side plate 39, contoured at this point to accommodate the roof sheet 41. Riveted to the lower vertical portion of the side plate 39 and overlying the door header 37 is a Z-shaped door retaining bar 42.

At the door frame posts 18, the car sheathing 40 overlaps and is riveted to the plates 28 and the lower edge or skirt of the sheathing 40 overlaps and is riveted to the leg 15 of the side sill Z-bar 12.

Accommodated within and secured to the Z-bar 12 at spaced points along each side of the car are the lower ends of the inwardly facing post channels 43 provided with outwardly extending flanges 44. The webs of the channels 43 are riveted to the sheathing 40 and the side plate 39, and their flanges are riveted or otherwise fastened to the reinforcing plate 38.

In a similar fashion, the upper end of the door frame, including its post 18, is integrally secured to the overhead structure.

As a result of this construction, it will be seen that the side sill 6 extends unbroken throughout substantially the length of the car; that the car door frame and car doorposts are receivable in the upwardly facing channel of the side sill and are formed as an integral part thereof; that the car door frame is formed as an integral unit and made integral with the overhead structure; and that the entire side of the car, including the side sill, door frame, side posts, side sheathing, and overhead structure forms a unitary girder wherein sagging of the side sill and door frame is precluded.

FIGS. 3, 4, 5, and 6 simply disclose other ways of fabricating the side sill 6 from a combination of rolled shapes, pressings or extrusions and plates riveted and/or welded together. In each case, the resulting side sill includes an inwardly extending channel 51 and an upwardly extending channel 52. The method resorted to for securing together the various shapes required for fabricating the side sill is, of course, optional. The important factor is that the side sill be provided with an inwardly facing channel and with an external and upwardly facing channel for the reception of the side posts and door frame and to which the car sheathing can be attached.

I claim:

1. A box car girder comprising: a side sill, including an inwardly facing channel provided at the upper portion of its outer face with an upwardly facing channel; a door frame bounded at its lower side by an angle having a downwardly extending leg and an inwardly extending leg, said downwardly extending leg being overlapped with and secured to the outer leg of said upwardly extending channel and said inwardly extending leg being fastened to the upper corner of said inwardly facing channel, whereby a box-like structure is formed.

2. A box car girder comprising: a side sill including a first inwardly facing channel provided at the upper portion of its outer face with an upwardly facing channel; a door frame provided with vertical members, each including a second inwardly facing channel having its lower end accommodated within and fastened to said upwardly facing channel, said second inwardly facing channel merging with and forming a part of a vertically extending, outwardly facing channel; a vertical plate overlapping both the outer face of said second inwardly facing channel and the outer face of said upwardly facing channel.

3. A box car girder such as defined in claim 2, wherein a vertical gusset is formed as a coplanar extension of the central web of the outwardly facing door frame channel, and wherein the lower end of said gusset overlaps and is secured to the outer face of the inwardly facing channel of said side sill.

References Cited in the file of this patent

UNITED STATES PATENTS

| | | |
|---|---|---|
| 1,949,745 | Jackson | Mar. 6, 1934 |
| 2,183,307 | Ditchfield | Dec. 12, 1939 |
| 2,286,954 | Clarke et al. | June 16, 1942 |
| 2,504,657 | Dean | Apr. 18, 1950 |
| 2,528,818 | Brown et al. | Nov. 7, 1950 |